United States Patent
Patel et al.

(10) Patent No.: US 7,644,098 B2
(45) Date of Patent: Jan. 5, 2010

(54) SYSTEM AND METHOD FOR IDENTIFYING ADVERTISEMENTS RESPONSIVE TO HISTORICAL USER QUERIES

(75) Inventors: Davesh Patel, Cupertino, CA (US); Bruce Campbell, Hertfordshire (GB); Soren Riise, London (GB); Martin Barnes, Essex (GB)

(73) Assignee: Yahoo! Inc., Sunnyvale, CA (US)

( * ) Notice: Subject to any disclaimer, the term of this patent is extended or adjusted under 35 U.S.C. 154(b) by 272 days.

(21) Appl. No.: 11/739,318

(22) Filed: Apr. 24, 2007

(65) Prior Publication Data

US 2008/0270355 A1 Oct. 30, 2008

(51) Int. Cl.
*G06F 17/00* (2006.01)
(52) U.S. Cl. .................. 707/101; 707/102; 707/103 R; 707/104.1
(58) Field of Classification Search .............. 707/1–10, 707/100–104.1, 200–206
See application file for complete search history.

(56) References Cited

U.S. PATENT DOCUMENTS

2007/0130003 A1* 6/2007 Davis et al. .................. 705/14

* cited by examiner

*Primary Examiner*—Isaac M Woo
(74) *Attorney, Agent, or Firm*—Seth H. Ostrow; Ostrow Kaufman & Frankl LLP (57) ABSTRACT

The present invention is directed towards systems and methods for identifying advertisements responsive to one or more historical queries generated by a given user. The method of the present invention comprises annotating a profile for a user with information associated with one or more historical queries generated by the user. The profile associated with the user is retrieved, the profile indicating one or more historical queries previously generated by the user. One or more advertisements are identified as responsive to a selected historical query maintained in the profile of the user. The one or more advertisements previously displayed to the user in response to the selected historical query are identified. The one or more advertisements identified as not previously displayed to the user are thereafter displayed.

24 Claims, 3 Drawing Sheets

SYSTEM AND METHOD FOR IDENTIFYING ADVERTISEMENTS RESPONSIVE TO HISTORICAL USER QUERIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The World Wide Web may be thought of as a distributed data store comprising billions of data content items through the Internet. Search engines are commonly used to search the content items available on computer networks, such as the World Wide Web, to enable users to locate content items of interest. A typical search engine is capable of accessing the plurality of web pages, hypertext documents, and other content items from the Internet or other network through use of a crawler.

To use search engine, a user of a client device typically enters one or more search terms or keywords comprising a query. The search engine thereafter identifies one or more content items responsive to the one or more search terms or keywords comprising a received query. The content items identified by the search engine may be combined to form a result set that is displayed to the user with which the query originated.

The content items identified by a search engine as responsive to a query received from a user may include one or more advertisements. Advertisements are commonly used on the Internet to promote various products and services. Advertisements may comprise banner ads, links to web pages, images, video, text, etc. The various advertisements used to promote products on the Internet may be displayed according to a variety of formats, such as in conjunction with a ranked result set in response to a query, embedded in a web page, a pop-up, etc. The advertisements displayed to a user of a client device may be selected, directly or indirectly redirecting the user to a website providing the advertised product or service.

Advertisements identified as responsive to a query received from a given user are typically maintained in one or more data stores, such as databases or servers, and are associated with one or more keywords. A search engine may perform a search of one or more data stores to identify the one or more advertisements associated with one or more keywords that match or are similar to the one or more terms comprising a given user query.

Current techniques for selecting advertisements responsive to a given query require the advertisements to exist at the time a given query is received. If a search engine is unable to identify advertisements responsive to a given query at the time the query is received, the user with which the query originated may not be presented with an advertisement, even though advertisements responsive to the query may become available hours, days, weeks, or months after the query was received.

Current techniques for selecting advertisements responsive to user queries thus fail to provide advertisements that may be responsive to queries that were previously generated by users. In order to overcome shortcomings associated with existing techniques for selecting advertisements responsive to user queries, the present invention provides systems and methods for identifying advertisements that are responsive to queries previously generated by a given user.

SUMMARY OF THE INVENTION

The present invention is directed towards system and methods for identifying advertisements responsive to one or more historical queries generated by a given user. The method of the present invention comprises annotating a profile for a user with information associated with one or more historical queries generated by the user. The information with which a profile is annotated may include information indicating a query generated by the user, which may include information indicating a time at which a query was generated by the user. The information with which a profile is annotated may further include information indicating one or more advertisements displayed in response to a query generated by the user or information indicating a frequency with which a given query was generated by the user.

The profile associated with the user is retrieved, wherein the profile indicates one or more historical queries previously generated by the user. One or more advertisements responsive to a selected historical query maintained in the profile of the user are identified. According to one embodiment of the present invention, identifying one or more advertisements responsive to a selected historical query comprises selecting a historical query from the profile of the user and identifying one or more advertisements previously displayed to the user in response to the selected historical query. According to one embodiment, selecting a historical query comprises selecting a historical query associated with a time value indicating an oldest historical query. According to another embodiment of the invention, selecting a historical query comprises selecting a historical query associated with a greatest frequency with which the user generated the historical query. Alternatively, or in conjunction with the foregoing, selecting a historical query may comprise selecting a historical query associated with a most recent time value.

According to one embodiment, identifying one or more advertisements responsive to a selected query comprises identifying one or more advertisements associated with keywords matching one or more terms comprising the selected historical query, and generating a result set comprising the one or more identified advertisements. Identifying the one or more advertisements previously displayed to the user may comprise retrieving information from the user profile indicating the one or more advertisements previously displayed to the user and identifying the one or more advertisements in the result set previously displayed to the user through use of the retrieved information.

The one or more advertisements identified as previously displayed to the user in response to the selected historical query may be removed from the result set. According to one embodiment, the one or more advertisements previously displayed are identified by retrieving unique identifiers associated with one or more advertisements previously displayed to the user and identifying the one or more advertisements in the result set with unique identifiers matching the retrieved unique identifiers. The one or more advertisements identified as not previously displayed to the user are thereafter displayed.

The present invention is further directed towards systems for identifying advertisements responsive to one or more historical queries generated by a given user. According to one embodiment, the system of the present invention comprises a search component operative to receive one or more queries from a given user and identify one or more advertisements responsive to the one or more queries received from the user. The search component is further operative to annotate a user profile associated with the user, wherein the profile maintains information associated with one or more historical queries generated by the user. According to one embodiment, the search component annotates the profile of a given user with information indicating a time at which the user generated a query, or information indicating one or more advertisements displayed in response to a query generated by the user. According to another embodiment of the invention, the search component annotates the profile of a given user with information indicating a frequency with which a user generated a given query, or information indicating one or more advertisements displayed in response to a query generated by the user.

The system further comprises a match component to retrieve the profile associated with the user, the profile indicating one or more historical queries previously generated by the user and identify one or more advertisements responsive to a selected historical query maintained in the profile of the user. According to one embodiment of the present invention, the match component selects a historical query from the profile of the user and identifies one or more advertisements previously displayed to the user in response to the selected historical query. The historical query selected by the match component may be selected through use of a variety of techniques, including, but not limited to, selecting a historical query associated with a time value indicating an oldest historical query, selecting a historical query associated with a greatest frequency with which the user generated the historical query, or selecting a query associated with a most recent time value.

According to one embodiment, the match component is operative to identify one or more advertisements associated with keywords matching one or more terms comprising the selected historical query. The one or more identified advertisements are used by the match component to generate a result set comprising the one or more identified advertisements.

The match component is further operative to identify the one or more advertisements previously displayed to the user in response to the selected historical query. According to one embodiment, the match component retrieves information from the user profile indicating the one or more advertisements previously displayed to the user, and identifies the one or more advertisements in the result set previously displayed to the user through use of the retrieved information. The information retrieved by the match component may comprise unique identifiers associated with one or more advertisements previously displayed to the user. The match component may then identify the one or more advertisements in the result set with unique identifiers matching the retrieved unique identifiers. According to one embodiment, the match component is further operative to remove the one or more advertisements in the result set previously displayed to the user through use of the retrieved information.

According to one embodiment, the system of the present invention further comprises a distribution component operative to receive a result set comprising one or more advertisements not previously displayed to the user in response to a selected historical query and distribute the one or more advertisements comprising the result set to the user associated with the selected historical query. The distribution component may distribute the one or more advertisements as pop-up advertisements or in a ranked list of one or more advertisements.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
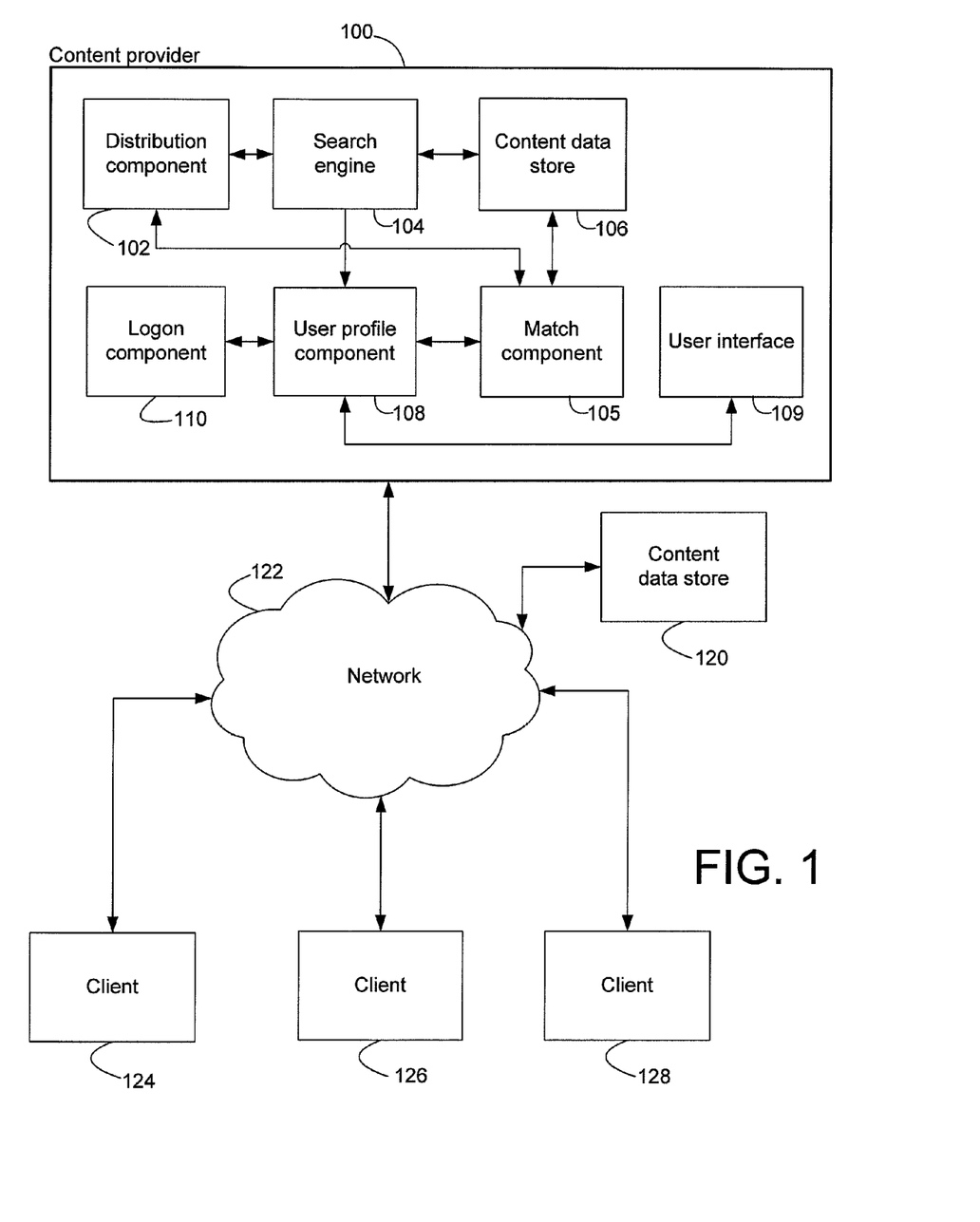
FIG. 1 is a block diagram presenting a system for identifying advertisements responsive to queries previously generated by a given user according to one embodiment of the present invention.

FIG. 1 presents a block diagram depicting one embodiment of a system for selecting advertisements responsive to queries previously generated by a given user. According to the embodiment illustrated in FIG. 1, client devices 124, 126 and 128 are communicatively coupled to a network 122, which may include a connection to one or more local and wide area networks, such as the Internet. According to one embodiment of the invention, a client device 124, 126 and 128 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Users of client device may logon to a content provider 100 via a logon component. The logon component 110 at the content provider 100 is operative to receive the credentials for a given user, wherein the credentials for a given user may comprise a username and password. The logon component 110 at the content provider 100 may utilize the credentials provided by a given user of a client device 124, 126, and 128 to retrieve a profile associated with the user maintained in a user profile component 108. The user profile component 108 is operative to maintain one or more user profiles for one or more users. A user profile maintained in the user profile component 108 may contain information including, but not limited to, user credentials, demographic information, age, sex, user preferences, etc.

After logging on to the content provider 100, a user of a client device 124, 126, and 128 communicatively coupled to the network 122 may submit one or more search queries comprising one or more terms to a search engine 104 at the content provider 100. An exemplary query received from a user of a client device 124, 126, and 128 has one or more terms. For example, the query "wireless notebook computer" contains three terms and may be referred to as a three-term query. Similarly, queries containing only one term are referred to as one-term queries, queries containing two terms are two-term queries, etc. A space or other delimiter character may be used to identify the individual terms comprising a given query.

The search engine 104 at the content provider 100 may utilize the one or more terms comprising a given query to identify one or more advertisements that are responsive to the one or more terms comprising the query. According to one embodiment, the search engine 104 at the content provider 100 uses communication pathways that the network 122 provides to access one or more remote 120 or local 106 content data stores to locate advertisements that are responsive to a given query received from a user of a client device 124, 126, and 128. Local 106 and remote 120 content data stores may comprise accessible memory structures such as a database, CD-ROM, tape, digital storage library, etc., and may be implemented as databases, file systems, or any other type of storage structures capable of providing for the retrieval and storage of a variety of advertisements associated with one or more advertisers.

The one or more advertisements identified by the search engine 104 as responsive to a query received from a user of a client device 124, 126, and 128 may be delivered to a distribution component 102 at the content provider 100. The distribution component 102 is operative to generate a display of the one or more advertisements identified as responsive to a given query received from a user of a client device 124, 126, and 128. The display generated by the distribution component 102 may be delivered to the user of the client device 124, 126, and 128 with which the query originated.

The search engine is further operative to annotate the profile of the user of the client device 124, 126, and 128 with which the query originated with the query submitted by the user to the content provider 100. For example, as previously described, a user of a client device 124, 126, and 128 may logon to the content provider 100, which results in the retrieval of the profile of the given user from the user profile component 108. The user profile retrieved for the given user may be annotated with the query submitted by the user to the content provider 100. Additionally, the user profile may be annotated with information indicating the time at which a given query was submitted to the content provider 100, as well as the frequency with which the user submitted the query to the content provider 100.

Additionally, the search engine 104 is operative to annotate the profile of the user of the client device 124, 126, and 128 with which the query originated with information indicating the one or more advertisements identified as responsive to the query and displayed to the user in response to the query. For example, a user of a client device 124, 126, and 128 may submit the query "notebook computers" to the search engine 104 at the content provider 100. The search engine 104 may perform a search one or more remote 120 or local 106 content data stores and identify advertisements "A," "B," and "C" responsive to the query "notebook computers." The search engine 104 may thereafter annotate the profile of the user with which the query originated to indicate that advertisements "A," "B" and "C" were identified as responsive to the query "notebook computers" submitted by the user to the content provider 100.

The one or more queries generated by a given user of a client device 124, 126, and 128 with which a user profile is annotated may be used to periodically identify advertisements responsive to such queries. According to one embodiment of the present invention, a match component at the content provider 105 is operative to periodically identify the one or more queries previously generated by a given user, as indicated by the profile associated with the user, and identify advertisements responsive to such queries. The match component 105 is thus operative to identify advertisements responsive to historical queries generated by a given user of a client device 124, 126, and 128. Accordingly, a user of a client device 124, 126, and 128 with which a query originated may be presented with advertisements responsive to the one or more queries previously generated by the user without the need to continuously generate and deliver the query to the content provider 100.

For example, a user of a client device may generate a query comprising the terms "luxury gold watches." The search engine at the content provider 104 may perform a search of one or more remote 120 or local 106 content data stores to identify advertisements responsive to the query "luxury gold watches." Additionally, the search engine 104 may annotate the profile associated with the user with which the query originated with the query "luxury gold watches," as well as the one or more advertisements selected as responsive to the query "luxury gold watches." Thereafter, the one or more remote 120 or local 106 content data stores may be updated with additional advertisements responsive to the query "luxury gold watches." The match component 105 may periodically perform a search of the one or more local 106 or remote 120 content data stores to identify advertisements not previously presented to the user with which the query originated that are responsive to the query "luxury gold watches" maintained in the profile associated with the given user.

According to one embodiment of the present invention, the match component 105 is operative to periodically select a query from the profile of a given user and perform a search of the one or more remote 120 or local 106 content data stores to locate advertisements responsive to a selected query. Alternatively, the match component 105 is operative to select a query from the profile of a given user and perform a search of the one or more remote 120 or local 106 content data stores to locate advertisements in response to a subsequent search by the user.

The match component 105 may select historical queries generated by a given user of a client device 124, 126, and 128 through use of a variety of techniques. According to one embodiment of the present invention, the match component 105 selects queries from a profile of a given user based upon time. For example, the match component 105 may select the oldest query from the profile of a given user by performing a comparison of the current time and the time at which the user of a client device 124, 126, and 128 generated the one or more queries maintained in the user profile. According to another embodiment of the present invention, the match component 105 selects queries from a profile of a given user based upon the frequency with which the one or more queries in the profile of the user were generated. Those of skill in the art recognize the plurality of techniques for selecting a historical query from the profile of a given user to identify advertisements responsive to such queries.

The one or more advertisements identified by the match component 105 as responsive to a query previously generated by a given user of a client device 124, 126, and 128 may be delivered to the distribution component 102 at the content provider 100. The distribution component 102 may generate a display of the one or more advertisements responsive to a historical query of a given user. For example, the one or more advertisements responsive to a historical query of a given user may be delivered to the client device 124, 126, and 128 of the user as a pop-up advertisement. Alternatively, or in conjunction with the foregoing, the one or more advertisements responsive to a historical query of a given user may be delivered to the client device 124, 126 and 128 of the user as part of a result set generated in response to a subsequent query from the given user. The user of the client device 124, 126, and 128 to which the advertisements are displayed may select one or more of the advertisements through use of a selection device, such as a mouse or keyboard, which may result in the user of the client device 124, 126, and 128 being redirected to content, such as a website, associated with the selected advertisement.

According to the embodiment illustrated in FIG. 1, a user interface 109 at the content provider 100 provides advertisers the ability to perform a search of the user profile component 108 and identify the one or more queries generated by users of client devices 124, 126, and 128. Through use of the user interface at the content provider 109, advertisers may identify the one or more queries that are generated by users of client devices 124, 126, and 128 with the greatest frequency. Similarly, through use of the user interface, 109, advertisers may identify the one or more queries that are frequently generated by users of client devices 124, 126, and 128 at one or more time periods. The information associated with the one or more queries generated by users of client devices 124, 126, and 128 may be used by one or more advertisers, such as to identify products or services that are in the greatest demand or the optimal time at which advertisements should be displayed to users of client devices 124, 126, and 128.

Figure 2:
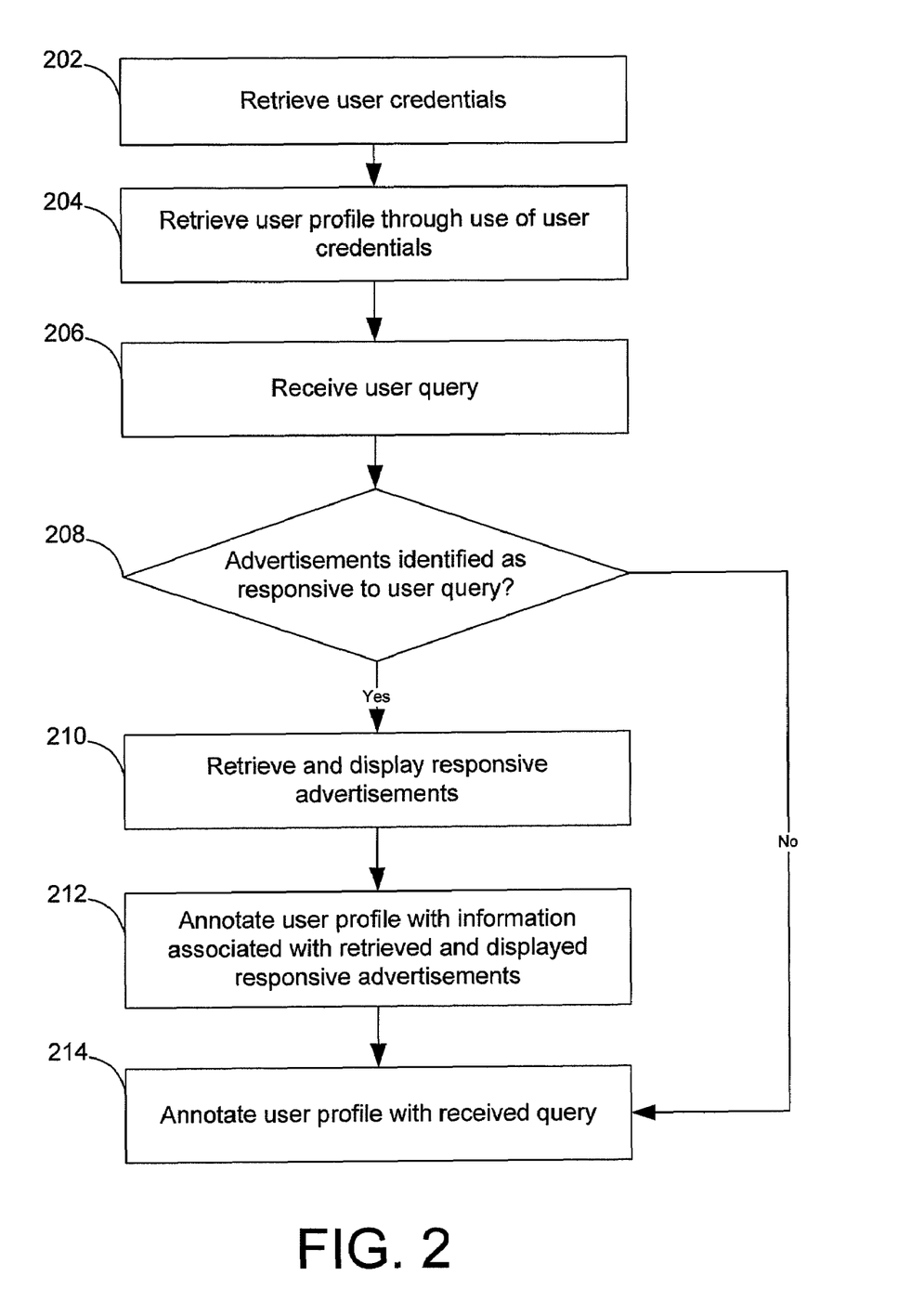
FIG. 2 is a flow diagram presenting a method for generating a user profile maintaining the one or more queries generated by a given user according to one embodiment of the present invention.

FIG. 2 is a flow diagram presenting a method for generating a user profile maintaining the one or more historical queries generated by a given user. According to the embodiment illustrated in FIG. 2, the credentials of a given user are received, step 202. The credentials of a given user may comprise a user name and password that uniquely identify a given user. Through use of the received user credentials, a user profile associated with the credentials provided by the user are received, step 204.

According to the embodiment illustrated in FIG. 2, a user query comprising one or more terms is received from the user associated with the received user credentials and the retrieved profile, step 206. A check is performed to determine whether one or more advertisements are responsive to the one or more terms comprising the query received from the given user 208. For example, a user may generate a query comprising the terms "Caribbean vacations." A search may be performed to determine whether one or more advertisements are associated with the terms "Caribbean" or "vacations."

If one or more advertisements are identified as responsive to the received user query, the one or more advertisements identified as responsive to the received user query are retrieved and displayed to the user with which the query originated, step 210. The one or more advertisements identified as responsive to the query may be displayed as images, pop-up advertisements, etc. The user with which the query originated may select one or more of the advertisements, redirecting the user a website associated with the selected advertisement.

The profile retrieved for the user with which the query originated is thereafter annotated with information associated with the one or more advertisements retrieved and displayed to the user in response to the received query, step 212. For example, a user may generate a query comprising the terms "notebook computer." A search may be performed of one or more advertisement data stores to identify one or more advertisements associated with the keywords "notebook computer." The search may identify that advertisements "X," "Y," and "Z" are associated with the keywords "notebook computer." Accordingly, advertisements "X," "Y," and "Z" may retrieved and displayed to the user. The profile associated with the user with which the query originated may be annotated with information indicating that advertisements "X," "Y," and "Z" were displayed to the user.

If no advertisements were identified as responsive to the query received from the given user, or after the profile of the user with which the query originated is annotated with information identifying the one or more advertisements retrieved and displayed to the user, the user profile is annotated with information associated with the query generated by the user, step 214. With reference to the abovementioned example, the user profile may be annotated with the query "notebook computer." According to one embodiment, the user profile is further annotated with information identifying the time at which the user generated one or more queries, as well as a count or other indicator identifying the frequency with which the user generated the one or more queries in the user profile. For example, the profile of a given user may contain a table or similar data structure identifying the one or more queries generated by the user, as well as a count or other numerical indicator identifying the frequency with which the user generated the one or more queries in the user profile and the time at which the one or more queries maintained in the user profile were generated by the given user.

Accordingly, a user profile maintains a record of the one or more queries generated by a given user. The record maintained in a user profile identifying the one or more historical queries generated by the user may thereafter be used to identify new or additional advertisements responsive to the one or more historical queries associated with the user, a cookie on the user device, etc.

Figure 3:
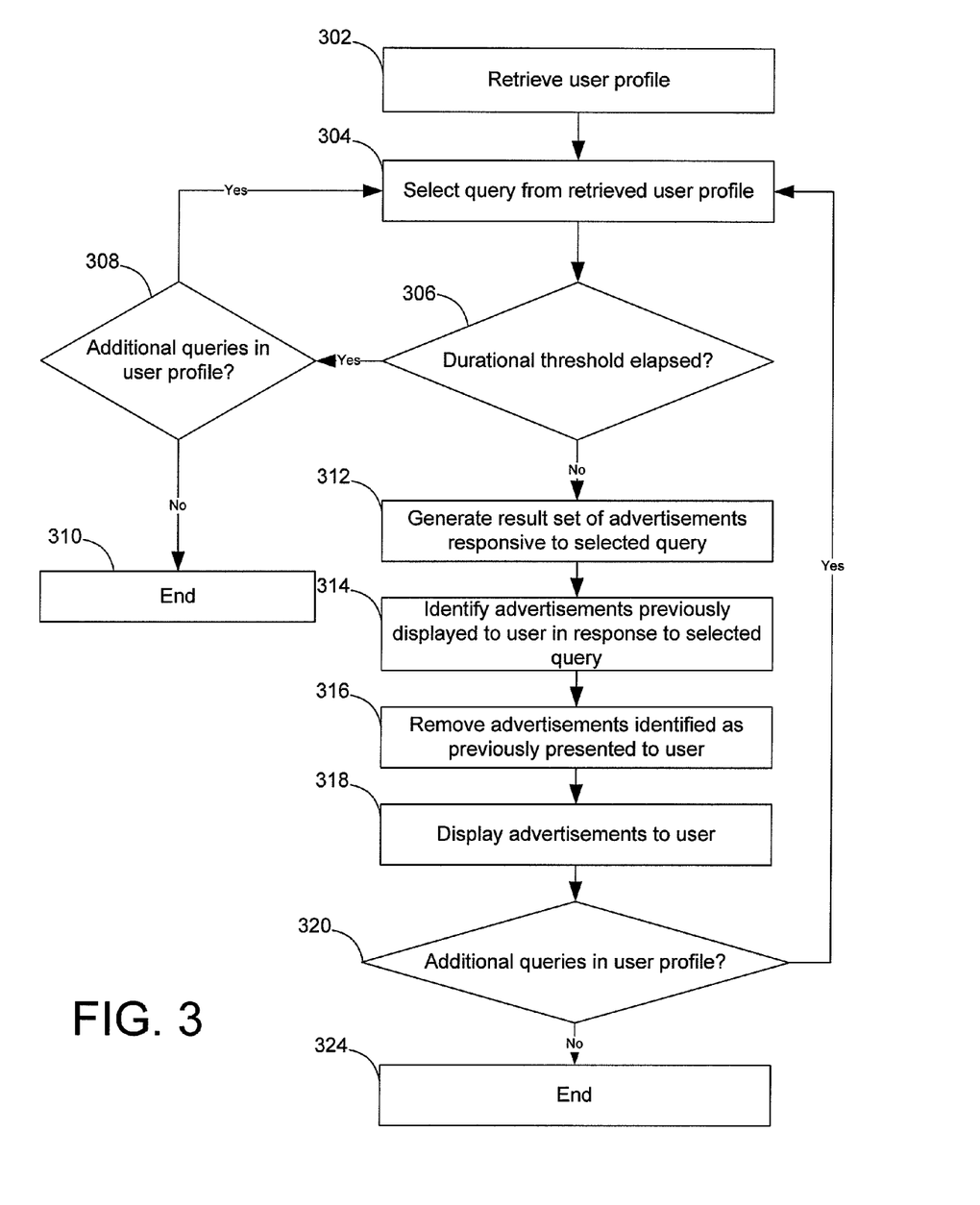
FIG. 3 is a flow diagram presenting a method for selecting one or more advertisements responsive to one or more queries previously generated by a given user according to one embodiment of the present invention.

FIG. 3 is a flow diagram presenting a method for selecting one or more advertisements responsive to one or more historical queries previously generated by a given user. According to the embodiment illustrated in FIG. 3, a profile of a given user is retrieved, step 302, such as through use of a user name and password, associated with a given user.

As previously described, a profile of a given user maintains information associated with the one or more historical queries generated by the user, as well as information identifying the one or more advertisements displayed in response to the one or more historical queries generated by the user. The information associated with the one or more queries generated by the user may include, but is not limited to, the one or more queries generated by the user, the time at which the one or more queries were generated by the user, and the frequency with which the user generated the one or more queries.

A given historical query, and the information associated with the query, is selected from among the one or more historical queries maintained in the profile of the user, step 304. The historical query selected at step 304 may be selected through use of a variety of techniques. For example, the historical query selected at step 304 may comprise the historical query most recently generated by the user. Similarly, the historical query selected at step 304 may comprise the historical query most frequently generated by the user, or the historical query associated with a time value indicating an oldest historical query.

A check is performed to determine whether the difference between the time at which the user generated the historical query and the current time exceeds a durational threshold, step 306. For example, a given user may have generated a given query on Jan. 1, 2006 at 10:05 p.m. The current time may comprise the value Jan. 3, 2006 at 10:05 p.m. Accordingly, the difference between the current time and the time associated with the historical query is 48 hours. The check performed at step 306 may determine whether the 48 hour difference between the time associated with the selected query and the current time exceeds the durational threshold. The durational threshold at step 306 may further comprise one or more sub-thresholds such a given sub-threshold affects pricing for display or selection of the advertisement. According to one embodiment, the smaller the amount of time that has elapsed since the user generated the given query, the greater the amount that the advertiser is charged for display or selection of the advertisement.

If the time at which the user generated the selected historical query and the current time exceeds the durational threshold, an additional check is performed to determine whether one or more additional historical queries are in the profile of the given user, step 308. If one or more additional queries are in the profile of the given user, another query is selected from among the one or more historical queries in the user profile, step 304. If no additional historical queries are in the profile of the given user, processing terminates, step 310.

If it is determined that the difference between the time associated with the selected historical query and the current time does not exceed the durational threshold, the one or more advertisements responsive to the selected query are retrieved and used to generate a result set comprising one or more advertisements, step 312. For example, a search may be performed of one or content data stores to identify one or more advertisements associated with keywords that match or are similar to the selected historical query. The one or more identified advertisements identified as responsive to the historical query may thereafter be retrieved and used to generate a result set comprising one or more advertisements.

A search of the generated result set is thereafter performed to identify the one or more advertisements previously displayed to the user in response to the selected historical query, step 314. As previously described, the profile of a given user may indicate the one or more advertisements previously displayed to the user in response to a given historical query. For example, the historical query selected at step 302 may comprise the query "laptop computers." In addition to indicating the time at which the historical query was generated, the profile of the user may further indicate that advertisements "1," "2" and "3" were displayed to the user in response to the query "laptop computers." Those of skill in the art recognize that the values "1," "2," and "3" may comprise any values including, but not limited to, any combination of numbers or characters that uniquely identify one or more advertisements.

The one or more advertisements identified as previously displayed to the user in response to the selected historical query are removed from the result set of one or more advertisements responsive to the selected historical query, step 316. For example, advertisements "A," "B," "C," "D," "E," and "F" may be identified as responsive to a given selected historical query. The profile of the user with which the query originated, however, may indicate that advertisements "B," "D" and "F" were previously displayed to the user in response to the selected historical query. Accordingly, advertisements "B," "D" and "F" may be removed from the result set, resulting in the result set containing advertisements "A," "C" and "E."

The one or more advertisements remaining in the result set may thereafter be presented to the user associated with the retrieved user profile, step 318. For example, the one or more advertisements may be presented as pop-up advertisements, in a ranked result set, etc. Those of skill in the art recognize the plurality of techniques for displaying advertisements responsive to a given query.

A check is thereafter performed to determine whether one or more additional queries in the user profile require analysis, step 320. If one or more additional queries require analysis, an additional historical query is selected from among the one or more historical queries maintained in the user profile, step 304. After an analysis has been performed with respect to the one or more historical queries maintained in the user profile, processing terminates, step 324.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computerized method for identifying advertisements responsive to one or more historical queries generated by a given user, the method comprising:
   annotating, using a processing device, a profile for a user with information associated with one or more historical network search engine queries generated by the user including annotating with information indicating the query generated by the user and a time in which the query was generated, the profile being electronically stored in a physical memory device;
   retrieving the profile associated with the user, the profile indicating one or more of the historical network search engine queries previously generated by the user;
   identifying, using the processing device, a plurality of advertisements responsive to a selected historical query maintained in the profile of the user;
   identifying previously displayed advertisements, which are advertisements that have been previously displayed to the user in response to the selected historical query as per the information in the profile;
   excluding the previously displayed advertisements from the plurality of advertisements;
   displaying, to a display device, the plurality of advertisements such that the previously displayed advertisements are excluded therefrom; and
   annotating the profile with information indicating the plurality of advertisements displaying on the display device.

2. The method of claim 1 wherein annotating a profile for a user comprises annotating the profile with information indicating a frequency with which a given query was generated by the user.

3. The method of claim 1 wherein identifying one or more advertisements responsive to a selected historical query comprises:
   selecting a historical query from the profile of the user; and
   identifying one or more advertisements previously displayed to the user in response to the selected historical query.

4. The method of claim 3 wherein selecting a historical query comprises selecting a historical query associated with a time value indicating an oldest historical query.

5. The method of claim 3 wherein selecting a historical query comprises selecting a historical query associated with a greatest frequency with which the user generated the historical query.

6. The method of claim 3 wherein selecting a historical query comprises selecting a query associated with a most recent time value.

7. The method of claim 1 wherein identifying one or more advertisements responsive to a selected historical query comprises:
   identifying one or more advertisements associated with keywords matching one or more terms comprising the selected historical query; and
   generating a result set comprising the one or more identified advertisements.

8. The method of claim 7 wherein identifying the one or more advertisements previously displayed to the user in response to the selected historical query comprises:
   retrieving information from the user profile indicating the one or more advertisements previously displayed to the user; and
   identifying the one or more advertisements in the result set previously displayed to the user through use of the retrieved information.

9. The method of claim 8 wherein identifying the one or more advertisements previously displayed to the user in response to the selected historical query comprises removing the one or more advertisements in the result set previously displayed to the user.

10. The method of claim 8 wherein retrieving information indicating one or more advertisements previously displayed to the user comprises:
    retrieving unique identifiers associated with one or more advertisements previously displayed to the user; and
    identifying the one or more advertisements in the result set with unique identifiers matching the retrieved unique identifiers.

11. A computerized system for identifying advertisements responsive to one or more historical queries generated by a given user, the system comprising:
    a network search engine search component processing device operative to:
      receive, via a networked connection, one or more user queries from a given user;
      identify one or more advertisements responsive to the one or more network search engine queries received from the user for performing a search on internet search engine; and
      annotate a user profile associated with the user, the profile maintaining information associated with one or more historical network search engine queries generated by the user including annotating with information indicating the query generated by the user and a time in which the quest was generated, the profile being electronically stored in a physical memory device;
    a physical memory device having the user profile stored thereon; and
    a match component processing device operative to:
      retrieve the profile associated with the user, the profile indicating one or more of the historical network search engine queries previously generated by the user;
      identify a plurality of advertisements responsive to a selected historical query maintained in the profile of the user;
      identify previously displayed advertisements which are advertisements that have been previously displayed to the user in response to the selected historical query;
      excluding the previously displayed advertisements form the plurality of advertisements;

presenting the plurality of advertisements to a display device for display thereon, such that the plurality of advertisements excludes the previously displayed advertisements; and annotating the profile with information indicating the plurality of advertisements to be displayed on the display device.

12. The system of claim 11 wherein the search component is operative to annotate a profile for a user with information indicating a frequency with which the user generated a given query.

13. The system of claim 11 wherein the search component is operative to annotate a profile for a user with information indicating one or more advertisements displayed in response to a query generated by the user.

14. The system of claim 11 wherein the match component is operative to:

select a historical query from the profile of the user; and identify one or more advertisements previously displayed to the user in response to the selected historical query.

15. The system of claim 14 wherein the match component is operative to select a historical query associated with a time value indicating an oldest historical query.

16. The system of claim 14 wherein the match component is operative to select a historical query associated with a greatest frequency with which the user generated the historical query.

17. The system of claim 14 wherein the match component is operative to select a query associated with a most recent time value.

18. The system of claim 11 wherein the match component is operative to:

identify one or more advertisements associated with keywords matching one or more terms comprising the selected historical query; and generate a result set comprising the one or more identified advertisements.

19. The system of claim 18 wherein the match component is operative to:

retrieve information from the user profile indicating the one or more advertisements previously displayed to the user; and identify the one or more advertisements in the result set previously displayed to the user through use of the retrieved information.

20. The system of claim 19 wherein the match component is operative to remove the one or more advertisements in the result set previously displayed to the user through use of the retrieved information.

21. The system of claim 19 wherein the search component is operative to:

retrieve unique identifiers associated with one or more advertisements previously displayed to the user; and identify the one or more advertisements in the result set with unique identifiers matching the retrieved unique identifiers.

22. The system of claim 11 further comprising a distribution component operative to:

receive a result set comprising one or more advertisements not previously displayed to the user in response to a selected historical query; and distribute the one or more advertisements comprising the result set to the user associated with the selected historical query.

23. The system of claim 22 wherein the distribution component is operative to distribute one or more advertisements as pop-up advertisements.

24. The system of claim 22 wherein the distribution component is operative to distribute one or more advertisements in a ranked list of advertisements.

* * * * *